US012663859B2

(12) United States Patent
Li et al.

(10) Patent No.: US 12,663,859 B2
(45) Date of Patent: Jun. 23, 2026

(54) COMMUNICATION METHOD, WEARABLE DEVICE, AND STORAGE MEDIUM

(71) Applicant: BEIJING XIAOMI MOBILE SOFTWARE CO., LTD., Beijing (CN)

(72) Inventors: Humin Li, Beijing (CN); Bohan Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 174 days.

(21) Appl. No.: 18/604,024

(22) Filed: Mar. 13, 2024

(65) Prior Publication Data

US 2025/0028387 A1     Jan. 23, 2025

(30) Foreign Application Priority Data

Jul. 19, 2023     (CN) .......................... 202310890833.9

(51) Int. Cl.
*G06F 3/01*          (2006.01)
*G06T 7/33*          (2017.01)
(Continued)

(52) U.S. Cl.
CPC .............. *G06F 3/013* (2013.01); *G06T 7/337* (2017.01); *G06T 7/50* (2017.01); *G06T 7/73* (2017.01);
(Continued)

(58) Field of Classification Search
CPC .......... G06F 3/013; G06F 3/012; G06F 3/011; G06T 7/337; G06T 7/50; G06T 7/73;
(Continued)

(56) References Cited

U.S. PATENT DOCUMENTS

| | | | |
|---|---|---|---|
| 11,598,957 B2 * | 3/2023 | Ilic | G02B 27/017 |
| 11,749,018 B1 * | 9/2023 | Torkos | G06V 20/20 |
| | | | 345/7 |

(Continued)

FOREIGN PATENT DOCUMENTS

CN          108197533 A     6/2018

OTHER PUBLICATIONS

Chen et al.; "3D Face Reconstruction and Gaze Tracking in the HMD for Virtual Interaction"; IEEE; Mar. 2022 (Year: 2022).*
European Patent Application No. 24163331.2, Search and Opinion dated Jul. 29, 2024, 11 pages.

*Primary Examiner* — David T Welch
(74) *Attorney, Agent, or Firm* — Cozen O'Connor

(57) ABSTRACT

A communication method, applied to a wearable device, includes: obtaining a first characteristic data collected by an eye tracking camera of the wearable device and a second characteristic data collected by an external camera other than the eye tracking camera, in which the first characteristic data represents data associated with eyes of a wearer of the wearable device, and the second characteristic data represents data associated with a face and a body of the wearer; based on the first characteristic data and the second characteristic data, performing image reconstruction on the wearer to obtain a reconstructed image, and the reconstructed image being configured to represent a virtual image of the wearer; and sending the reconstructed image to a communication device to be communicated with the wearable device, to allow the wearable device and the communication device to be communicated based on the reconstructed image.

15 Claims, 3 Drawing Sheets obtaining a first feature data collected by an eye tracking camera of the wearable device and a second feature data collected by an external camera other than the eye tracking camera          S101 based on the first feature data and the second feature data, performing image reconstruction on a wearer to obtain a reconstructed image          S102 sending the reconstructed image to a communication device to be communicated with the wearable device, to allow the wearable device and the communication device to be communicated based on the reconstructed image          S103

(51) Int. Cl.

| | |
|---|---|
| *G06T 7/50* | (2017.01) |
| *G06T 7/73* | (2017.01) |
| *G06T 13/20* | (2011.01) |
| *G06T 13/40* | (2011.01) |
| *G06T 13/80* | (2011.01) |
| *G06V 10/776* | (2022.01) |
| *G06V 40/16* | (2022.01) |

(52) U.S. Cl.

CPC ............ *G06T 13/205* (2013.01); *G06T 13/40* (2013.01); *G06T 13/80* (2013.01); *G06V 10/776* (2022.01); *G06V 40/174* (2022.01); *G06T 2207/30201* (2013.01)

(58) Field of Classification Search

CPC ....... G06T 13/205; G06T 13/40; G06T 13/80; G06T 2207/30201; G06V 10/776; G06V 40/174; G06V 40/168; G06V 40/193; H04N 7/157; H04N 13/275; H04N 13/344; H04N 13/371; H04N 13/398
USPC .......................................................... 345/419
See application file for complete search history.

(56) References Cited

U.S. PATENT DOCUMENTS

| | | | | |
|---|---|---|---|---|
| 11,908,098 | B1* | 2/2024 | Hutchinson | G06T 7/55 |
| 2012/0242698 | A1* | 9/2012 | Haddick | G06Q 30/02 |
| | | | | 345/633 |
| 2015/0309316 | A1* | 10/2015 | Osterhout | G06F 3/03547 |
| | | | | 345/8 |
| 2016/0026253 | A1* | 1/2016 | Bradski | H04N 13/128 |
| | | | | 345/8 |
| 2018/0158246 | A1 | 6/2018 | Grau et al. | |
| 2019/0098070 | A1* | 3/2019 | Kim | G06F 3/013 |
| 2019/0243472 | A1* | 8/2019 | Stafford | G02B 27/017 |
| 2019/0387168 | A1* | 12/2019 | Smith | G06T 7/246 |
| 2021/0392175 | A1* | 12/2021 | Gronau | H04L 65/1093 |
| 2021/0392296 | A1* | 12/2021 | Rabinovich | G06N 3/094 |
| 2022/0051412 | A1* | 2/2022 | Gronau | G06V 40/172 |
| 2022/0286657 | A1* | 9/2022 | Oz | H04N 7/157 |
| 2022/0334638 | A1* | 10/2022 | Anderson | G06V 10/98 |
| 2022/0414964 | A1 | 12/2022 | Qin | |
| 2024/0005537 | A1* | 1/2024 | Amberg | G06T 7/521 |
| 2024/0353922 | A1* | 10/2024 | Dedonato | G06T 13/80 |
| 2025/0022237 | A1* | 1/2025 | Burton | G06T 19/006 |

* cited by examiner

COMMUNICATION METHOD, WEARABLE DEVICE, AND STORAGE MEDIUM

CROSS-REFERENCE TO RELATED APPLICATION

This application is based on and claims priority to Chinese Patent Application No. 202310890833.9 filed on Jul. 19, 2023, the entire contents of which are incorporated herein by reference for all purposes.

BACKGROUND

Currently, a remote communication technology based on a wearable device such as AR glasses or VR glasses is a new application. In a process of remote communication with the wearable device, an eye tracking camera for capturing eye movement and a camera for capturing a face may be built into the wearable device to achieve the remote communication. However, as the wearable device needs to additionally introduce the camera for capturing the face, the power consumption and weight of the wearable device will be increased, so that the wearing comfort is decreased and the need to monitor electricity use is increased. If an external camera is used alone to achieve the remote communication, the eyes of the wearer are obscured because of wearing a glasses device, thus resulting in a decrease in recognition accuracy of the eyes or inability to recognize the eyes.

SUMMARY

The present disclosure relates to a field of computer vision, and more particularly to a communication method, a wearable device, and a storage medium.

According to a first aspect of embodiments of the present disclosure, there is provided a communication method applied to a wearable device, and the method at least includes: obtaining a first characteristic data collected by an eye tracking camera of the wearable device and a second characteristic data collected by an external camera other than the eye tracking camera, in which the first characteristic data represents data associated with eyes of a wearer of the wearable device, and the second characteristic data represents data associated with a face and a body of the wearer; and based on the first characteristic data and the second characteristic data, performing image reconstruction on the wearer to obtain a reconstructed image, and the reconstructed image being configured to represent a virtual image of the wearer; and sending the reconstructed image to a communication device to be communicated with the wearable device, to allow the wearable device and the communication device to be communicated based on the reconstructed image.

According a second aspect of embodiments of the present disclosure, there is provided a wearable device, and the device at least includes: a processor; and a memory for storing instructions executable by the processor. The processor is configured to execute the communication method according to the first aspect.

According a third aspect of embodiments of the present disclosure, there is provided a storage medium, which enables a wearable device to execute the communication method according to the first aspect, when instructions in the storage medium are executed by a processor of the wearable device.

It should be understood that both the forgoing general descriptions and the following detailed descriptions are illustrative and explanatory only, and are not restrictive of the present disclosure.

BRIEF DESCRIPTION OF THE DRAWINGS

The drawings herein are incorporated into the specification and form a part of the specification, show embodiments that comply with the present disclosure, and are used to explain the principles of the present disclosure together with the specification.

DETAILED DESCRIPTION

Illustrative embodiments are described in detail here, examples of which are shown in the accompanying drawings. When the following description refers to the accompanying drawings, unless specified or limited otherwise, the same number in different accompanying drawings indicates the same or similar elements. The embodiments described in the following illustrative examples are not representative of all embodiments consistent with the present disclosure. Rather, they are only examples of devices and methods that are consistent with some aspects of the present disclosure as detailed in the appended claims.

Figure 1:
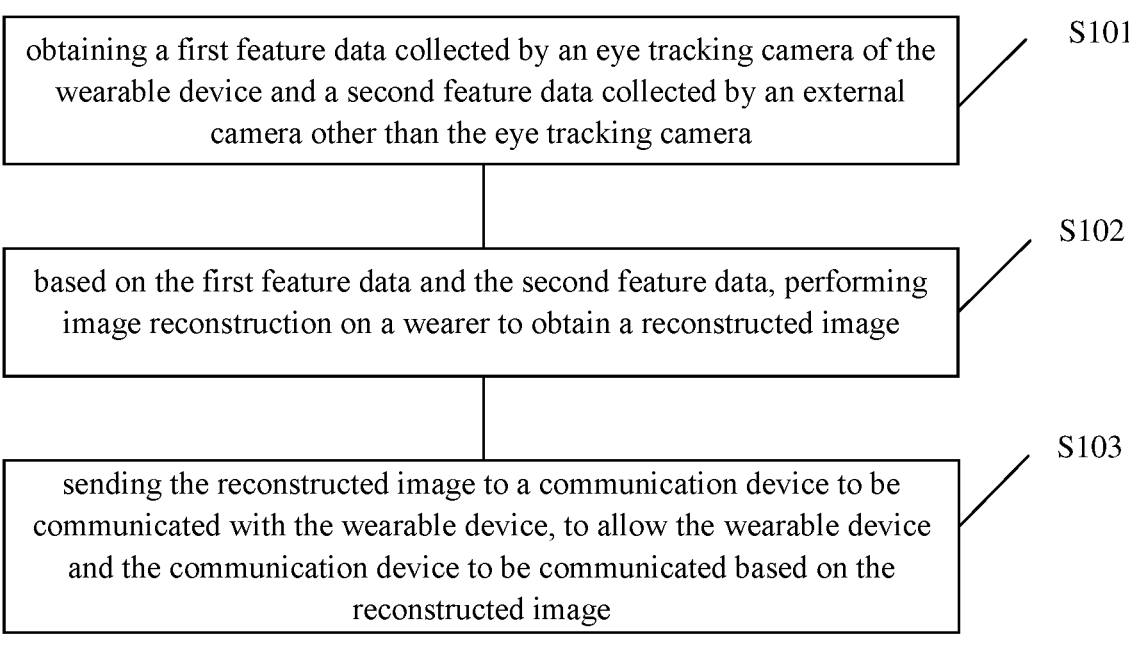
FIG. 1 is a flow chart of a communication method according to an illustrative embodiment.

Embodiments of the present disclosure provide a communication method. FIG. 1 is a flow chart of a communication method according to an illustrative embodiment. This communication method is applied in a scene where remote communication is carried out based on a wearable device, which can make remote the communication more immersive and achieve more natural and intuitive remote communication. For example, in a process of a wearer wearing the wearable device and communicating with a communication device through the wearable device, communication based on a reconstructed image may achieve that a virtual image of the wearer is displayed in the field of view through a virtual reality technology, thus achieving an effect of face-to-face remote communication. As shown in FIG. 1, the wearable device executes the communication method with the following steps.

At step S101, a first characteristic data collected by an eye tracking camera of the wearable device and a second characteristic data collected by an external camera other than the eye tracking camera are obtained. The first characteristic data represents data associated with eyes of the wearer, and the second characteristic data represents data associated with a face and a body of the wearer.

At step S102, based on the first characteristic data and the second characteristic data, image reconstruction is performed on a wearer to obtain a reconstructed image.

At step S103, the reconstructed image is sent to a communication device to be communicated with the wearable device, to allow the wearable device and the communication device to be communicated based on the reconstructed image.

In the embodiments of the present disclosure, the wearable device may be communicated remotely with the communication device, and the wearable device may include an augmented reality (AR) glasses device or a virtual reality (VR) glasses device. The communication device may include a smart phone, a laptop, a tablet, an AR glasses device, or a VR glasses device, which is not limited by the embodiments of the present disclosure.

Taking as an example in which the wearable device is the AR glasses device and the communication device is the smart phone, the AR glasses device may obtain a virtual image representing the wearer wearing the AR glasses device by executing the communication method. During the communication between the AR glasses device and the smart phone, the virtual image of the wearer may be sent to the communication device, achieving a more natural and intuitive remote communication between the AR glasses device and the smart phone.

At step S101, the eye tracking camera described above is a built-in camera of the wearable device, and the first characteristic data collected by the eye tracking camera represents the data associated with the eyes of the wearer. For example, the first characteristic data may include characteristic data of an eye key point. The characteristic data of the eye key point includes: size data and position data of the eye key point. The eye key point includes an eyeball, upper and lower eyelids, or an eyebrow, etc., which is not limited by the embodiments of the present disclosure.

The external camera described above is not a built-in camera of the wearable device, and the second characteristic data collected by the external camera represents the data associated with the face and the body of the wearer. For example, the second characteristic data may include characteristic data of a facial key point and characteristic data of a body key point. The facial key point includes a mouth, a nose, a cheek, and other key points; and the body key point includes an arm, a leg, a finger, a head, and other key points, which are not limited by the embodiments of the present disclosure.

It should be noted that the external camera may be a built-in camera of a camera device, and the camera device is an independent device from the wearable device. The camera device may include a smart phone, a laptop, a tablet, a smart watch, or a surveillance camera device, etc., which is not limited by the embodiments of the present disclosure.

In the embodiments of the present disclosure, the first characteristic data and the second characteristic data may be obtained through detection of the key point. For the first characteristic data, the manner of the detection of the key point may include a detection manner such as Convolutional Neural Networks (CNN) or Recurrent Neural Networks (RNN), etc.; and for the second characteristic data, the manner of the detection of the key point may include a manner of deep learning, such as OpenPose, etc.

Herein, since the eye tracking camera and the external camera are cameras on different devices, the clock synchronization of the eye tracking camera and the external camera is required before the image reconstruction of the wearer. In some embodiments, the obtaining the first characteristic data collected by the eye tracking camera of the wearable device and the second characteristic data collected by the external camera other than the eye tracking camera, includes: sending a clock synchronization signal to the camera device where the external camera is located or receiving a clock synchronization signal sent by the camera device, the clock synchronization signal being configured for the clock synchronization of the eye tracking camera and the external camera; and performing collection based on the eye tracking camera and the external camera after the clock synchronization, to obtain the first characteristic data and the second characteristic data.

In other words, the embodiments of the present disclosure perform a clock synchronization calibration on the eye tracking camera and the external camera, so that the first characteristic data and the second characteristic data collected by the two cameras can ensure data synchronization, and thus the driving consistency can be ensured in a process of driving a preset virtual drive model based on the first characteristic data and the second characteristic data, so as to obtain a better reconstructed image.

In the embodiments of the present disclosure, the clock synchronization signal may be sent at preset time intervals. The preset time interval may be set in a range of 150 milliseconds to 250 milliseconds, which is not limited by the embodiments of the present disclosure.

It should be noted that, in the case that the wearable device serves as a data synchronization center, the wearable device may send the clock synchronization signal to the camera device, so that the external camera in the camera device may synchronize the clock with the eye tracking camera, so as to achieve the data synchronization of the first characteristic data collected by the eye tracking camera and the second characteristic data collected by the external camera.

In the case that the camera device serves as the data synchronization center, the camera device may send the clock synchronization signal to the wearable device, so that the eye tracking camera of the wearable device may synchronize the clock with the external camera, so as to also achieve the data synchronization of the first characteristic data collected by the eye tracking camera and the second characteristic data collected by the external camera.

In the embodiments of the present disclosure, the wearable device and the camera device may be connected in the same communication network, so that the clock synchronization may be carried out based on the same communication network, which makes the data transmission of the clock synchronization faster and the data transmission delay of the clock synchronization lower.

At step S102, the image reconstruction is performed on the wearer based on the first characteristic data and the second characteristic data, the reconstructed image obtained by the image reconstruction represents the virtual image of the wearer, and the virtual image is displayed in the field of view during remote communication, which can achieve an immersive communication experience between a user of the communication device and the wearer of the wearable device. The virtual image of the wearer may be a two-dimensional image or a three-dimensional image, which is not limited by the embodiments of the present disclosure.

In the embodiments of the present disclosure, the first characteristic data represents the data associated with the eyes of the wearer, and correspondingly, the eyes of the wearer may be reconstructed based on the first characteristic data; and the second characteristic data represents the data associated with the face and the body of the wearer, and correspondingly, the face and the body of the wearer may be reconstructed based on the second characteristic data. In this way, by reconstructing the eyes of the wearer and reconstructing the face and the body of the wearer, the virtual image of the wearer may be obtained.

It should be noted that the reconstructed image obtained from the image reconstruction of the wearer may be an image sequence, and the virtual image of the wearer constructed based on the image sequence may be linked and can present the animation effect of the virtual image of the wearer. The virtual image may correspond to an animal model digital human, a cartoon digital human, or a hyper realistic digital human of digital humans, which is not limit by the embodiments of the present disclosure.

At step S103, the reconstructed image is sent to the communication device to be communicated with the wearable device, which may include that: the wearable device sends the reconstructed image to an intermediate server device, the server device transfers the reconstructed image to the communication device, and the communication device may display the virtual image of the wearer, so as to achieve the immersive remote communication between the wearable device and the communication device.

For example, in a scene of a video conference or a remote call, the wearable device may send the reconstructed image to the communication device, and the virtual image of the wearer is displayed on a display screen through the communication device. In this way, the user of the communication device may see the virtual image of the wearer in the field of view. Of course, the characteristic data of the user of the communication device may also be collected, and the virtual image of the user of the communication device may be obtained based on the characteristic data of the user of communication device and then sent to the wearable device, so that the wearer of the wearable device can also see the virtual image of the user of the communication device. In this way, the above manner can achieve an immersive conference experience or remote call experience between the wearer of the wearable device and the user of the communication device.

It should be noted that the reconstructed image may also be configured for self-display and be sent to other display devices (such as a television device) for display, which is not limited by the embodiments of the present disclosure.

In the embodiments of the present disclosure, the reconstructed image is obtained through the first characteristic data and the second characteristic data obtained by the eye tracking camera of the wearable device and the external camera, so that the wearable device and the communication device can be communicated based on the reconstructed image. In this way, it is not necessary to arrange an additional camera for capturing the face and the body in the wearable device in the embodiments of the present disclosure, which can avoid a situation of increase of the power consumption and weight of the wearable device due to the additional camera, thus improving the wearing comfort of the wearable device, and reducing the anxiety of electricity use. Moreover, in the embodiments of the present disclosure, the image of the wearer is reconstructed by combining the eye tracking camera and the external camera, rather than using the external camera alone, which can avoid a situation of inaccuracy of eye data collected externally due to the eyes of the wearer being obstructed by the wearable device, so as to improve the accuracy of eye recognition during the image reconstruction, thus reconstructing a better virtual image of the wearer, and enhancing the immersive communication experience of the wearable device.

In some embodiments, the performing the image reconstruction on the wearer to obtain the reconstructed image based on the first characteristic data and the second characteristic data, includes: performing feature fusion on the eye characteristic data and the facial characteristic data, to obtain a facial fusion data; based on the facial fusion data and a body characteristic data, obtaining a model-driven data; and based on the model-driven data and a voice data collected by the wearable device, obtaining the reconstructed image.

In the embodiments of the present disclosure, the first characteristic data includes the eye characteristic data; and the second characteristic data includes the facial characteristic data and the body characteristic data. In a process of the external camera collecting the second characteristic data, the facial characteristic data collected by the external camera is not very accurate due to the eyes of the wearer being obstructed by the wearable device. Therefore, the eye characteristic data collected by the eye tracking camera is fused with the facial characteristic data.

It should be noted that during the feature fusion of the eye characteristic data and the facial characteristic data, the eye characteristic data may be input into a first layer of model-level fusion to obtain a first fusion data, then the first fusion data and the facial characteristic data are input into a second layer of model-level fusion to obtain a second fusion data, and finally the second fusion data is input into a fully connected layer to obtain the facial fusion data; or, alignment may be made based on the facial characteristic data and a standard facial data, and then correction is made based on a facial alignment data obtained by alignment, to obtain the facial fusion data.

In the embodiments of the present disclosure, after the facial fusion data is obtained through the feature fusion, the model-driven data may be obtained based on the facial fusion data and the body characteristic data, and the model-driven data is configured to drive the virtual drive model, so that a reconstructed virtual image of the wearer can present the animation effect during the communication.

It should be noted that the communication is usually a voice call, which may be a social type voice call or a conference type voice call, and this is not limited by the embodiments of the present disclosure.

Herein, in the embodiments of the present disclosure, after a model-driven parameter is obtained, the voice data also needs to be collected, and the reconstructed image is obtained based on the model-driven data and the voice data. In other words, during the voice call, the user of the communication device according to the embodiments of the present disclosure not only may see the virtual image of the wearer, but also may synchronously hear the virtual image outputting the voice data, thus improving the immersive communication experience of the wearable device.

In some embodiments, the performing the feature fusion on the eye characteristic data and the facial characteristic data to obtain the facial fusion data, includes: aligning the facial characteristic data with the standard facial data, to obtain the facial alignment data; based on an initial eye data in the facial alignment data and the eye characteristic data, obtaining an eye correction scale; correcting the eye characteristic data based on the eye correction scale, to obtain an eye correction data; and fusing the eye correction data into the facial alignment data, to obtain the facial fusion data.

In the embodiments of the present disclosure, the face of the wearer presents different forms in different expressions, so it is necessary to align the facial characteristic data. A facial alignment manner may include performing alignment based on a human face model or based on deep learning of convolutional neural networks. The human face model may include an Active Shape Model (ASM) or an Active Appearance Model (AAM); and the deep learning based on convolutional neural networks may include either DeepID convolutional neural networks or DeepFace convolutional neural networks.

In some embodiments, the aligning the facial characteristic data with the standard facial data to obtain the facial alignment data, includes: based on a plurality of facial key points of the facial characteristic data and a plurality of standard key points of the standard facial data, obtaining an overall optimization error of facial alignment; and performing nonlinear optimization on the overall optimization error, to obtain the facial alignment data.

In the embodiments of the present disclosure, the obtaining the overall optimization error of facial alignment based on the plurality of facial key points of the facial characteristic data and the plurality of standard key points of the standard facial data, may include: based on the plurality of facial key points and the plurality of standard key points, obtaining a data error, a smoothing error and a key point error of facial alignment; and based on the data error, the smoothing error and the key point error, obtaining the overall optimization error.

Herein, in the embodiments of the present disclosure, based on the plurality of facial key points and the plurality of standard key points, the data error $E_d(X)$ may be obtained through formula (1), the smoothing error $E_s(X)$ may be obtained through formula (2), and the key point error $E_l(X)$ may be obtained through formula (3).

$$E_d(X) = \sum_{v_i \in V} w_i * dist^2(\tau, X_i * v_i) \tag{1}$$

X represents the facial key point; $v_i$ represents a vertex of an i-th standard key point; V represents a set of the vertexes; $w_i$ represents an i-th weight; $\tau$ represents a point of the plurality of facial key points closest to the vertex of the standard key point; dist( ) represents a distance function configured to calculate a distance; $X_i$ represents a transformation matrix corresponding to $v_i$.

$$E_s(X) = \sum_{(i,j) \in E} \|(X_i - X_j) * G\|_F^2 \tag{2}$$

i and j are two labels for converting the facial key point; $X_i$ represents a transformation matrix corresponding to $v_i$; $X_j$ represents a transformation matrix corresponding to $v_j$; and G represents a diagonal matrix of 4*4.

$$E_l(X) = \sum_{(v_i, l) \in L} \|(X_i * v_i - l)\| \tag{3}$$

l represents the facial key point, and L represents a set of the facial key point and the transformation matrix.

It should be noted that during the facial alignment, the plurality of facial key points may be selected to match with the plurality of standard key points, and the number of selected points may be set within a range of 15 to 25, which is not limited by the embodiments of the present disclosure.

In the embodiments of the present disclosure, the obtaining the overall optimization error based on the data error, the smoothing error, and the key point error, may include: obtaining a first product of the smoothing error and a first coefficient; obtaining a second product of the key point error and a second coefficient; and based on the sum of the data error, the first product and the second product, obtaining the overall optimization error.

Herein, the overall optimization error E may be obtained through formula (4).

$$E = E_d(X) + \alpha * E_s(X) + \beta * E_l(X) \tag{4}$$

$\alpha$ represents the first coefficient and $\beta$ represents the second coefficient.

In the embodiments of the present disclosure, after obtaining the overall optimization error, the nonlinear optimization may be performed on the overall optimization error to obtain the facial alignment data. The nonlinear optimization manner may include either a nonlinear least squares method or a Gaussian Newton method, which is not limited by the embodiments of the present disclosure.

It should be noted that after obtaining the facial alignment data, since the initial eye data and the eye characteristic data in the facial alignment data are data of different dimensions, it is necessary to calculate the correction scale based on the initial eye data and the eye characteristic data.

In some embodiments, the obtaining the eye correction scale based on the initial eye data in the facial alignment data and the eye characteristic data, includes: obtaining a relative external parameter of the eye tracking camera and the external camera; based on the relative external parameter, a center coordinate of two eye key points contained in the eye characteristic data, and a preset depth distance of the eye tracking camera relative to the eye key point, obtaining an actual distance between the two eye key points; and based on a ratio of an initial distance between two eye key points in the initial eye data to the actual distance, obtaining the eye correction scale.

In the embodiments of the present disclosure, due to different poses of the eye tracking camera and the external camera in real space, it is necessary to determine the relative external parameter between the two cameras, so as to determine a mapping relationship between the characteristic data collected by different cameras, thus realizing that the eye tracking camera and the external camera can be combined for image reconstruction. The relative external parameter between the eye tracking camera and the external camera refer to a transformation relationship between camera coordinate systems of the eye tracking camera and the external camera.

In some embodiments, the obtaining the relative external parameter of the eye tracking camera and the external camera, may include: by a reference object such as a calibration plate, a calibration rod, and the like, determining an internal parameter and an external parameter of the eye tracking camera, and an internal parameter and an external parameter of the external camera; by comparing an image of the reference object obtained by the eye tracking camera and an image of the reference object obtained by the external camera, determining a mapping relationship between the eye tracking camera and the external camera; and by the mapping relationship, the internal parameter and the external parameter of the eye tracking camera, and the internal parameter and the external parameter of the external camera, obtaining the relative external parameter of the eye tracking camera and the external camera.

In some other embodiments, the obtaining the relative external parameter of the eye tracking camera and the external camera, may include: determining a common view image in the images obtained by the eye tracking camera and the external camera; determining a coordinate of the common view image in a world coordinate system; then determining initial external parameters of the eye tracking camera and the external camera; establishing a mapping relationship of the common view image in pixel coordinate systems or image coordinate systems of different cameras; and determining the relative external parameter of the eye tracking camera and the external camera based on the mapping relationship and the initial external parameters.

In the embodiments of the present disclosure, after obtaining the relative external parameter, the actual distance between the two eye key points may be obtained based on the relative external parameter and the center coordinate of the two eye key points. The two eye key points may include two eyeball key points, two eyelid key points, or two eyebrow key points, which is not limited by the embodiments of the present disclosure.

In some embodiments, the obtaining the actual distance between the two eye key points based on the relative external parameter, the center coordinate of the two eye key points contained in the eye characteristic data, and the preset depth distance of the eye tracking camera relative to the eye key point, includes: based on the center coordinate of the two eye key points and the depth distance, obtaining three-dimensional coordinates of the two eye key points; and based on the three-dimensional coordinates of the two eye key points and the relative external parameter, obtaining the actual distance between the two eye key points.

In the embodiments of the present disclosure, the two eye key points include a left eye key point and a right eye key point; the three-dimensional coordinate of the left eye key point may be obtained based on the product of the center coordinate of the left eye key point, the depth distance and a third coefficient; and the three-dimensional coordinate of the right eye key point may be obtained based on the product of the center coordinate of the right eye key point, the depth distance and the third coefficient.

Herein, the three-dimensional coordinate $P_{3Dl}$ of the left eye key point may be obtained through formula (5), and the three-dimensional coordinate $P_{3Dr}$ of the right eye key point may be obtained through formula (6).

$$P_{3Dl} = K^{-1} * d * P_{uvl} \tag{5}$$

$$P_{3Dr} = K^{-1} * d * P_{uvr} \tag{6}$$

K represents the third coefficient; d represents the depth distance; $P_{uvl}$ represents the center coordinate of the left eye key point; and $P_{uvr}$ represents the center coordinate of the right eye key point.

In the embodiments of the present disclosure, the obtaining the actual distance between the two eye key points based on the three-dimensional coordinates of the two eye key points and the relative external parameter, may include: obtaining a third product between the relative external parameter and the three-dimensional coordinate of the right eye key point; and based on a difference between the three-dimensional coordinate of the left eye key point and the third product, obtaining the actual distance.

Herein, the actual distance dist may be obtained through formula (7). $T_{lr}$ represents the relative external parameter.

$$dist = P_{3Dl} - T_{lr} * P_{3Dr} \tag{7}$$

In the embodiments of the present disclosure, after obtaining the actual distance, the eye correction scale may be obtained through formula (7).

$$S = Fd/dist \tag{8}$$

S represents the eye correction scale; Fd represents the initial distance.

In the embodiments of the present disclosure, the eye correction scale is configured to correct the eye characteristic data. After obtaining the eye correction data, fusing the eye correction data into the facial alignment data to obtain the facial fusion data, may include: substituting the eye correction data into the facial alignment data to obtain the facial fusion data.

In this way, in the embodiments of the present disclosure, the facial alignment data is first obtained through alignment, then the eye correction data is obtained based on the facial alignment data obtained through alignment, and finally the facial fusion data is obtained based on fusion of the eye correction data, so that the accuracy of fusion can be improved by alignment and correction.

In some embodiments, the model-driven data includes an expression weight and coordinates of a plurality of body key points; and the obtaining the model-driven data based on the facial fusion data and the body characteristic data, includes: based on a target expression represented by the facial fusion data, a plurality of preset benchmark expressions, and weights of the plurality of benchmark expressions, obtaining an expression weight corresponding to the target expression; and mapping the plurality of body key points of the body characteristic data to a three-dimensional space to obtain the coordinates of the plurality of body key points.

In the embodiments of the present disclosure, the obtaining the expression weight corresponding to the target expression based on the target expression represented by the facial fusion data, the plurality of preset benchmark expressions, and the weights of the plurality of benchmark expressions, may include: obtaining the product of the weights of the plurality of benchmark expressions and the plurality of benchmark expressions, to obtain an expression vector; and obtaining a difference value based on the difference between the expression vector and the target expression, and based on norm processing of the difference value, obtaining the expression weight.

Herein, the expression weight f(w) may be obtained through formula (9).

$$f(w) = \left\| A * [w_0 \ \ldots \ w_{n-1}]^T - B \right\|_F^2 \tag{9}$$

A represents the plurality of benchmark expressions; $[w_0 \ \ldots \ w_{n-1}]^T$ represents the weights of the plurality of benchmark expressions; and B represents the target expression.

In the embodiments of the present disclosure, the model-driven data for the face is the expression weight, and the model-driven data for the body is the coordinates of the plurality of body key points obtained by mapping the plurality of body key points to the three-dimensional space. Herein, in the embodiments of the present disclosure, a spatial coordinate system may be first established, and then the coordinates of the plurality of body key points may be obtained through positions of the plurality of body key points and a spatial transformation matrix. In this way, in the embodiments of the present disclosure, the model-driven data can be obtained, which can thus achieve the driving of the virtual drive model, so that the reconstructed virtual image of the wearer can present the animation effect in the communication process.

In some embodiments, the obtaining the reconstructed image based on the model-driven data and the voice data collected by the wearable device, includes: obtaining the virtual drive model; and based on the model-driven data and the voice data collected by the wearable device, driving the virtual drive model, to obtain the reconstructed image.

In the embodiments of the present disclosure, the virtual drive model is a model that can be driven by a simulated driving parameter, to present the animation effect. The obtaining the virtual drive model may include: obtaining a three-dimensional digital human model; performing calculation for a face of the three-dimensional digital human model by means of task expressions or manual modeling; performing binding for a body of the three-dimensional digital human model by means of standard skeleton points, and performing skin and weight calculation for each skeleton point of the bound model, so as to obtain the virtual drive model.

The driving the virtual drive model to obtain the reconstructed image based on the model-driven data and the voice data collected by the wearable device, may include first driving the virtual drive model based on the model-driven data and the voice data collected by the wearable device, and then rendering the driven model by a rendering engine, to obtain the reconstructed image. The rendering engine may include an Unreal Engine (UE) and a Unity Engine, which are not limited by the embodiment of the present disclosure.

It should be noted that the virtual drive model is driven by the model-driven data and the voice data together, which can achieve synchronously hearing the virtual image of the wearer outputting the voice data while seeing the virtual image of the wearer, thus improving the immersive communication experience of the wearable device.

To better understand the communication method according to one or more embodiments of the present application, examples of the embodiments of the present disclosure are also as follows.

Figure 2:
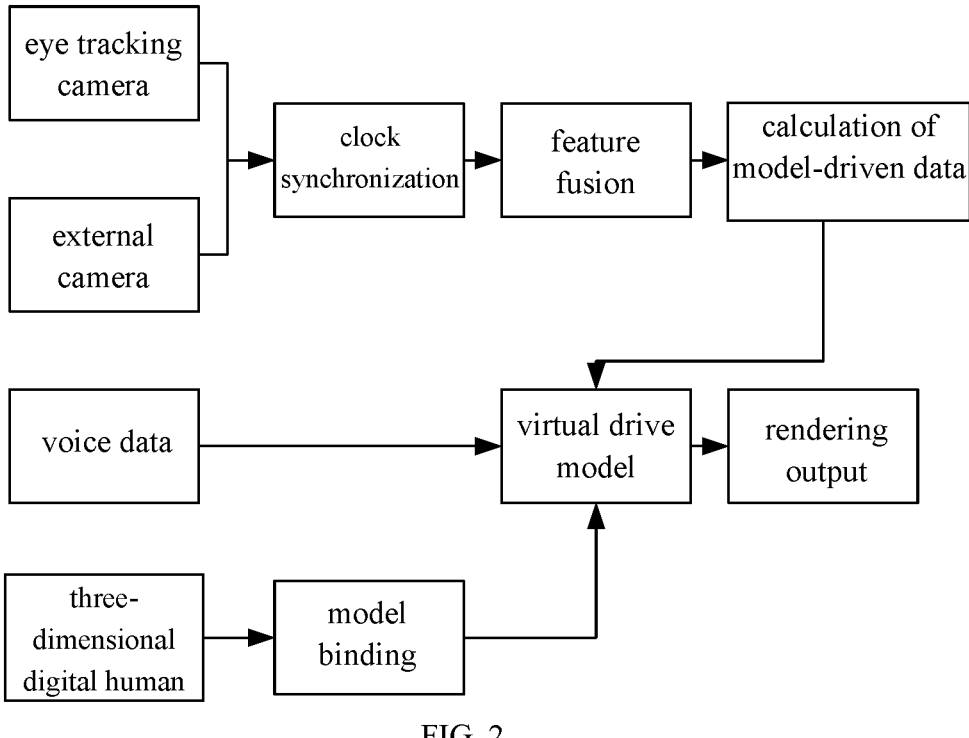
FIG. 2 is a block diagram of an image reconstruction process according to an illustrative embodiment.

As shown in FIG. 2, in the embodiments of the present disclosure, the three-dimensional digital human model may be first obtained, and the three-dimensional digital human model is bound to obtain the virtual drive model; then, the clock synchronization is performed on the eye tracking camera and the external camera, and the first characteristic data and the second characteristic data are collected; then, the feature fusion is performed on the eye characteristic data included in the first characteristic data and the facial characteristic data included in the second characteristic data to obtain the facial fusion data; based on the facial fusion data and the body characteristic data, the model-driven data is obtained; then, the virtual drive model is driven based on the model-driven data and the voice data collected by the wearable device; and finally, the driven model is rendered by the rendering engine to obtain the reconstructed image.

In this way, through the clock synchronization of the eye tracking camera and the external camera, the feature fusion of the eye characteristic data and the facial characteristic data, the calculation of the model-driven data, the driving of the virtual drive model, and the final rendering output, it is possible to achieve the image reconstruction of the wearer through the eye tracking camera and the external camera so as to obtain the virtual image of the wearer. It may be seen that, in the embodiments of the present disclosure, it is not necessary to arrange the additional camera for capturing the face and the body in the wearable device, which can avoid the situation of increase of power consumption and weight of the wearable device due to the additional camera, thus improving the wearing comfort of the wearable device and reducing the anxiety of electricity use.

Moreover, in the embodiments of the present disclosure, the image of the wearer also can be reconstructed by combining the eye tracking camera and the external camera together, rather than using the external camera alone, which can avoid the situation of inaccuracy of eye data collected externally due to the eyes of the wearer being obstructed by the wearable device, so as to improve the accuracy of eye recognition in the process of image reconstruction, thus reconstructing the better virtual image of the wearer, and enhancing the immersive communication experience of the wearable device.

Figure 3:
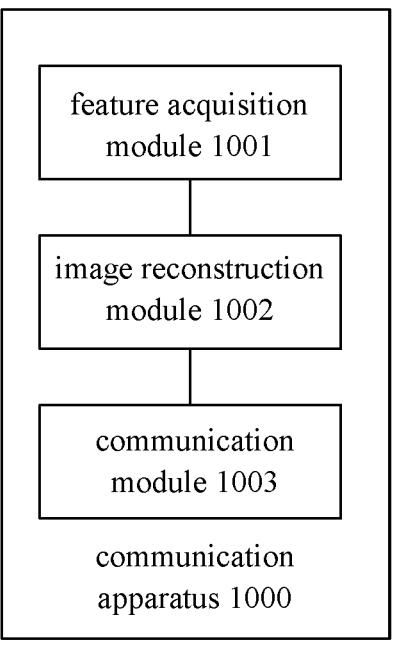
FIG. 3 is a block diagram of a communication apparatus according to an illustrative embodiment.

The embodiments of the present disclosure further provide a communication apparatus which is applied to the wearable device. FIG. 3 is a block diagram of a communication apparatus according to an illustrative embodiment. As shown in FIG. 3, the communication apparatus 1000 includes: a feature acquisition module 1001, configured to obtain a first characteristic data collected by an eye tracking camera of the wearable device and a second characteristic data collected by an external camera other than the eye tracking camera, the first characteristic data representing data associated with eyes of the wearer, and the second characteristic data representing data associated with a face and a body of the wearer; an image reconstruction module 1002, configured to perform image reconstruction on the wearer to obtain a reconstructed image based on the first characteristic data and the second characteristic data; and a communication module 1003, configured to send the reconstructed image to a communication device to be communicated with the wearable device, to allow the wearable device and the communication device to be communicated based on the reconstructed image.

In some embodiments, the first characteristic data includes an eye characteristic data, and the second characteristic data includes a facial characteristic data and a body characteristic data. The image reconstruction module 1002 includes: a fusion module, configured to perform feature fusion on the eye characteristic data and the facial characteristic data, to obtain a facial fusion data; a drive calculation module, configured to obtain a model-driven data based on the facial fusion data and the body characteristic data; and a data reconstruction module, configured to obtain the reconstructed image based on the model-driven data and a voice data collected by the wearable device.

In some embodiments, the fusion module is further configured to: align the facial characteristic data with a standard facial data, to obtain a facial alignment data; based on an initial eye data in the facial alignment data and the eye characteristic data, obtain an eye correction scale; correct the eye characteristic data based on the eye correction scale, to obtain an eye correction data; and fuse the eye correction data into the facial alignment data, to obtain the facial fusion data.

In some embodiments, the fusion module is further configured to: obtain an overall optimization error of facial alignment based on a plurality of facial key points of the facial characteristic data and a plurality of standard key points of the standard facial data; and perform nonlinear optimization on the overall optimization error, to obtain the facial alignment data.

In some embodiments, the fusion module is further configured to: obtain a relative external parameter of the eye tracking camera and the external camera; based on the relative external parameter, a center coordinate of two eye key points contained in the eye characteristic data, and a preset depth distance of the eye tracking camera relative to the eye key point, obtain an actual distance between the two eye key points; and based on a ratio of an initial distance between two eye key points in the initial eye data to the actual distance, obtain the eye correction scale.

In some embodiments, the fusion module is further configured to: obtain a three-dimensional coordinate of the two eye key points based on the center coordinate of the two eye key points and the depth distance; and obtain the actual distance between the two eye key points based on three-dimensional coordinates of the two eye key points and the relative external parameter.

In some embodiments, the model-driven data includes an expression weight and coordinates of a plurality of body key points; and the drive calculation module is configured to: based on a target expression represented by the facial fusion data, a plurality of preset benchmark expressions, and weights of the plurality of benchmark expressions, obtain an expression weight corresponding to the target expression; and map the plurality of body key points of the body characteristic data to a three-dimensional space to obtain the coordinates of the plurality of body key points.

In some embodiments, the data reconstruction module is further configured to: obtain a virtual drive model; and based on the model-driven data and a voice data collected by the wearable device, drive the virtual drive model, to obtain the reconstructed image.

In some embodiments, the feature acquisition module 1001 is further configured to: send a clock synchronization signal to a camera device where the external camera is located or receive the clock synchronization signal sent by the camera device, the clock synchronization signal being configured for the clock synchronization of the eye tracking camera and the external camera; and perform collection based on the eye tracking camera and the external camera after the clock synchronization, to obtain the first characteristic data and the second characteristic data.

The specific manner of performing the operation of each module in the apparatus according to the above embodiment has been described in detail in the embodiments of the method, which will not be elaborated here.

Figure 4:
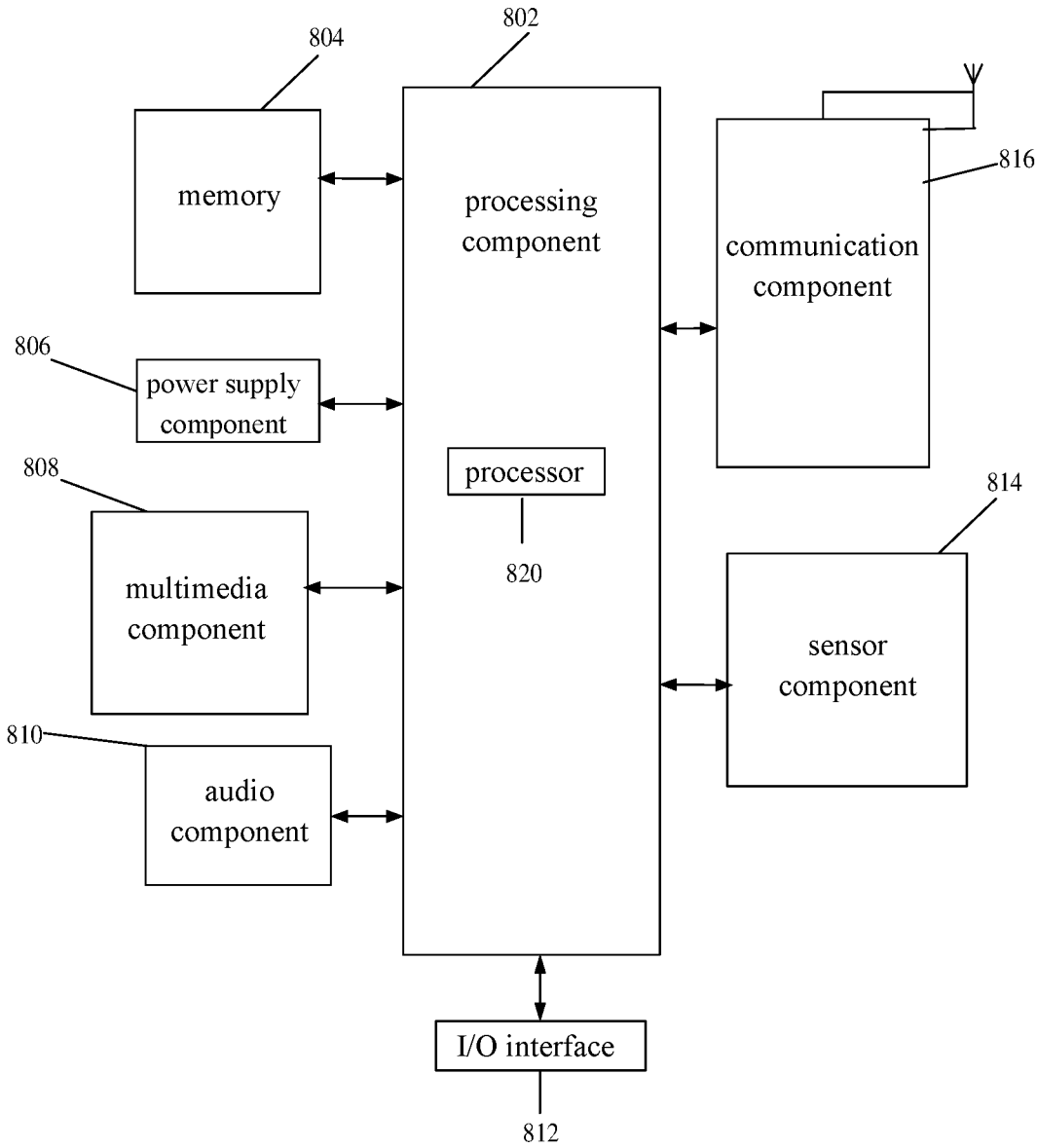
FIG. 4 is a block diagram of a wearable device according to an illustrative embodiment.

FIG. 4 is a block diagram of a wearable device according to an illustrative embodiment. For example, the wearable device 800 may be a mobile phone, a computer, a digital broadcast terminal, a messaging device, a game console, a tablet device, a medical device, a fitness device, and a personal digital assistant, etc.

Referring to FIG. 4, the wearable device 800 may include one or more of the following components: a processing component 802, a memory 804, a power supply component 806, a multimedia component 808, an audio component 810, an input/output (I/O) interface 812, a sensor component 814, and a communication component 816.

The processing component 802 typically controls the overall operation of the wearable device 800, such as the operation associated with display, telephone call, data communication, camera operation and recording operation. The processing component 802 may include one or more processors 820 to execute instructions to complete all or part of steps of the method described above. In addition, the processing component 802 may include one or more modules, to facilitate the interaction between the processing component 802 and other components. For example, the processing component 802 may include a multimedia module, to facilitate the interaction between the multimedia component 808 and the processing component 802.

The memory 804 is configured to store various types of data to support the operation of the device 800. Examples of these data include interactions of any applications or methods operated on the wearable device 800, contact data, phonebook data, messages, pictures, videos, etc. The memory 804 may be implemented with any types of volatile or non-volatile memory device, or a combination thereof, such as static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or an optical disk.

The power supply component 806 provides power to various components of the wearable device 800. The power supply component 806 may include a power management system, one or more power supplies, and other components associated with generating, managing, and distributing power for the wearable device 800.

The multimedia component 808 includes a screen providing an output interface between the wearable device 800 and a user. In some embodiments, the screen may include a liquid crystal display (LCD) and a touch panel (TP). If the screen includes a touch panel, the screen may be implemented as a touch screen, to receive an input signal from the user. The touch panel includes one or more touch sensors to sense touch, sliding, and a gesture on the touch panel. The touch sensor can not only sense the boundary of a touch or sliding action, but also detect the duration and pressure associated with the touch or sliding action. In some embodiments, the multimedia component 808 includes a front-facing camera and/or a rear-facing camera. When the device 800 is in an operating mode, such as a shooting mode or a video mode, the front-facing camera and/or the rear-facing camera may receive external multimedia data. Each front-facing camera and rear-facing camera may be a fixed optical lens system or have a focal length and an optical zoom capability.

The audio component 810 is configured to output and/or input an audio signal. For example, the audio component 810 includes a microphone (MIC), and the microphone is configured to receive an external audio signal when the wearable device 800 is in an operating mode, such as a call mode, a record mode, and a voice recognition mode. The received audio signal may be further stored in the memory 804 or be sent via the communication component 816. In some embodiments, the audio component 810 further includes a speaker for outputting the audio signal.

The I/O interface 812 provides an interface between the processing component 802 and a peripheral interface module, and the peripheral interface module may be a keyboard, a clicking wheel, a button, and the like. These buttons may include but are not limited to: a home button, a volume button, a start button, and a lock button.

The sensor component 814 includes one or more sensors for providing condition assessment of various aspects for the wearable device 800. For example, the sensor component 814 may detect the open/closed state of the device 800, the relative positioning of the components, for example, the components are a display screen and a keypad of the wearable device 800, and the sensor component 814 may also detect changes in the position of the wearable device 800 or a component of the wearable device 800, the presence or absence of contact between the user and the wearable device 800, the orientation or acceleration/deceleration of the wearable device 800, and the temperature change of the wearable device 800. The sensor component 814 may include a proximity sensor, configured to detect the presence of nearby objects without any physical contact. The sensor component 814 may further include an optical sensor, such as CMOS or CCD image sensors, for use in imaging applications. In some embodiments, the sensor component 814 may further include an acceleration sensor, a gyroscope sensor, a magnetic sensor, a pressure sensor, or a temperature sensor.

The communication component 816 is configured to facilitate wired or wireless communication between the wearable device 800 and other devices. The wearable device 800 may be connected to a wireless network which is based on a communication standard, such as WiFi, 3G, 5G, or a combination thereof. In an illustrative embodiment, the communication component 816 receives broadcast signals or broadcast-related information from an external broadcast management system through a broadcast channel. In an illustrative embodiment, the communication component 816 also includes a near-field communication (NFC) module, to facilitate short-range communication. For example, the NFC module may be implemented based on radio frequency identification (RFID) technology, infrared data association (IrDA) technology, ultra-wideband (UWB) technology, Bluetooth™ (BT) technology and other technologies.

In an illustrative embodiment, the wearable device 800 may be implemented by one or more application-specific integrated circuits (ASIC), digital signal processors (DSP), digital signal processing devices (DSPD), programmable logic devices (PLD), field-programmable gate arrays (FPGA), controllers, microcontrollers, microprocessors, or other electronic components for performing the above method.

In an illustrative embodiment, a non-temporary computer-readable storage medium including instructions is further provided, such as the memory 804 including instructions, and the instructions may be executed by the processor 820 of the wearable device 800 to complete the above method. For example, the non-temporary computer-readable storage medium may be a ROM, a random access memory (RAM), a CD-ROM, a magnetic tape, a floppy disk, an optical data storage device, etc.

A non-temporary computer-readable storage medium enables the wearable device to execute the communication method when the instructions in the storage medium are executed by the processor of the wearable device, and the method includes: obtaining a first characteristic data collected by an eye tracking camera of the wearable device and a second characteristic data collected by an external camera other than the eye tracking camera, the first characteristic data representing data associated with eyes of a wearer of the wearable device, and the second characteristic data representing data associated with a face and a body of the wearer; based on the first characteristic data and the second characteristic data, performing image reconstruction on the wearer to obtain an reconstructed image, and the reconstructed image being configured to represent a virtual image of the wearer; and sending the reconstructed image to a communication device to be communicated with the wearable device, to allow the wearable device and the communication device to be communicated based on the reconstructed image.

Other embodiments of the present disclosure will be apparent to those skilled in the art after consideration of the specification and practice of the invention disclosed here. This application is intended to cover any variations, usages, or adaptations of the present disclosure, which follow the general principles of the present disclosure and including such departures from the present disclosure as come within known or customary practice in the art. The specification and embodiments are merely considered to be illustrative and the substantive scope and spirit of the present disclosure is limited only by the appended claims.

It should be understood that the present disclosure is not limited to the precise structure as described above and shown in the drawings, but can have various modifications and alternations without departing from the scope of the present disclosure. The scope of the present disclosure is limited only by the appended claims.

What is claimed is:

1. A communication method, applied to a wearable device, comprising:

obtaining a first characteristic data collected by an eye tracking camera of the wearable device and a second characteristic data collected by an external camera other than the eye tracking camera, wherein the first characteristic data represents data associated with eyes of a wearer of the wearable device, and the second characteristic data represents data associated with a face and a body of the wearer;

based on the first characteristic data and the second characteristic data, performing image reconstruction on the wearer to obtain a reconstructed image, and the reconstructed image being configured to represent a virtual image of the wearer; and sending the reconstructed image to a communication device in communication with the wearable device, to allow the wearable device and the communication device to be in communication based on the reconstructed image;

wherein the first characteristic data comprises an eye characteristic data, the second characteristic data comprises a facial characteristic data and a body characteristic data, and the performing image reconstruction on the wearer to obtain the reconstructed image based on the first characteristic data and the second characteristic data comprises:

performing feature fusion on the eye characteristic data and the facial characteristic data to obtain a facial fusion data;

based on the facial fusion data and the body characteristic data, obtaining a model-driven data; and based on the model-driven data and a voice data collected by the wearable device, obtaining the reconstructed image;

wherein the performing feature fusion on the eye characteristic data and the facial characteristic data to obtain the facial fusion data, comprises:

aligning the facial characteristic data with a standard facial data to obtain a facial alignment data;

based on an initial eye data in the facial alignment data and the eye characteristic data, obtaining an eye correction scale;

correcting the eye characteristic data based on the eye correction scale to obtain an eye correction data; and fusing the eye correction data into the facial alignment data to obtain the facial fusion data.

2. The method according to claim 1, wherein the aligning the facial characteristic data with the standard facial data to obtain the facial alignment data comprises:

based on a plurality of facial key points of the facial characteristic data and a plurality of standard key points of the standard facial data, obtaining an overall optimization error of facial alignment; and performing nonlinear optimization on the overall optimization error to obtain the facial alignment data.

3. The method according to claim 1, wherein the obtaining the eye correction scale based on the initial eye data in the facial alignment data and the eye characteristic data comprises:

obtaining a relative external parameter of the eye tracking camera and the external camera;

based on the relative external parameter, a center coordinate of two eye key points contained in the eye characteristic data, and a preset depth distance of the eye tracking camera relative to the eye key point, obtaining an actual distance between the two eye key points; and based on a ratio of an initial distance between two eye key points in the initial eye data to the actual distance, obtaining the eye correction scale.

4. The method according to claim 3, wherein the obtaining the actual distance between the two eye key points based on the relative external parameter, the center coordinate of the two eye key points contained in the eye characteristic data, and the preset depth distance of the eye tracking camera relative to the eye key point, comprises:

based on the center coordinate of the two eye key points and the depth distance, obtaining three-dimensional coordinates of the two eye key points; and based on the three-dimensional coordinates of the two eye key points and the relative external parameter, obtaining the actual distance between the two eye key points.

5. The method according to claim 1, wherein the model-driven data comprises an expression weight and coordinates of a plurality of body key points, and the obtaining the model-driven data based on the facial fusion data and the body characteristic data comprises:

based on a target expression represented by the facial fusion data, a plurality of preset benchmark expressions, and weights of the plurality of benchmark expressions, obtaining an expression weight corresponding to the target expression; and mapping the plurality of body key points of the body characteristic data to a three-dimensional space to obtain the coordinates of the plurality of body key points.

6. The method according to claim 1, wherein the obtaining the reconstructed image based on the model-driven data and the voice data collected by the wearable device comprises:

obtaining a virtual drive model; and based on the model-driven data and the voice data collected by the wearable device, driving the virtual drive model to obtain the reconstructed image.

7. The method according to claim 1, wherein the obtaining the first characteristic data collected by the eye tracking camera of the wearable device and the second characteristic data collected by the external camera other than the eye tracking camera, comprises:

sending a clock synchronization signal to a camera device where the external camera is located or receiving the clock synchronization signal sent by the camera device, the clock synchronization signal being configured for the clock synchronization of the eye tracking camera and the external camera; and performing collection based on the eye tracking camera and the external camera after the clock synchronization to obtain the first characteristic data and the second characteristic data.

8. A wearable device, comprising:

a processor; and a memory for storing instructions executable by the processor;

wherein the processor is configured to:

obtain a first characteristic data collected by an eye tracking camera of the wearable device and a second characteristic data collected by an external camera other than the eye tracking camera, wherein the first characteristic data represents data associated with eyes of a wearer of the wearable device, and the second characteristic data represents data associated with a face and a body of the wearer;

based on the first characteristic data and the second characteristic data, perform image reconstruction on the wearer to obtain a reconstructed image, and the reconstructed image being configured to represent a virtual image of the wearer; and send the reconstructed image to a communication device in communication with the wearable device, to allow the wearable device and the communication device to be in communication based on the reconstructed image;

wherein the first characteristic data comprises an eye characteristic data, the second characteristic data comprises a facial characteristic data and a body characteristic data, and the processor is further configured to:

perform feature fusion on the eye characteristic data and the facial characteristic data to obtain a facial fusion data;

based on the facial fusion data and the body characteristic data, obtain a model-driven data; and based on the model-driven data and a voice data collected by the wearable device, obtain the reconstructed image;

wherein the processor is further configured to:

align the facial characteristic data with a standard facial data to obtain a facial alignment data;

based on an initial eye data in the facial alignment data and the eye characteristic data, obtain an eye correction scale;

correct the eye characteristic data based on the eye correction scale to obtain an eye correction data; and fuse the eye correction data into the facial alignment data to obtain the facial fusion data.

9. The wearable device according to claim 8, wherein the processor is further configured to:

based on a plurality of facial key points of the facial characteristic data and a plurality of standard key points of the standard facial data, obtain an overall optimization error of facial alignment; and perform nonlinear optimization on the overall optimization error to obtain the facial alignment data.

10. The wearable device according to claim 8, wherein the processor is further configured to:

obtain a relative external parameter of the eye tracking camera and the external camera;

based on the relative external parameter, a center coordinate of two eye key points contained in the eye characteristic data, and a preset depth distance of the eye tracking camera relative to the eye key point, obtain an actual distance between the two eye key points; and based on a ratio of an initial distance between two eye key points in the initial eye data to the actual distance, obtain the eye correction scale.

11. The wearable device according to claim 10, wherein the processor is further configured to:

based on the center coordinate of the two eye key points and the depth distance, obtain three-dimensional coordinates of the two eye key points; and based on the three-dimensional coordinates of the two eye key points and the relative external parameter, obtain the actual distance between the two eye key points.

12. The wearable device according to claim 8, wherein the model-driven data comprises an expression weight and coordinates of a plurality of body key points, and the processor is further configured to:

based on a target expression represented by the facial fusion data, a plurality of preset benchmark expressions, and weights of the plurality of benchmark expressions, obtain an expression weight corresponding to the target expression; and map the plurality of body key points of the body characteristic data to a three-dimensional space to obtain the coordinates of the plurality of body key points.

13. The wearable device according to claim 8, wherein the processor is further configured to:

obtain a virtual drive model; and based on the model-driven data and the voice data collected by the wearable device, drive the virtual drive model to obtain the reconstructed image.

14. The wearable device according to claim 8, wherein the processor is further configured to:

send a clock synchronization signal to a camera device where the external camera is located or receiving the clock synchronization signal sent by the camera device, the clock synchronization signal being configured for the clock synchronization of the eye tracking camera and the external camera; and perform collection based on the eye tracking camera and the external camera after the clock synchronization to obtain the first characteristic data and the second characteristic data.

15. A non-transitory computer-readable storage medium, storing instructions thereon, wherein in case that the instructions are executed by a processor of a wearable device, the wearable device is enabled to:

obtain a first characteristic data collected by an eye tracking camera of the wearable device and a second characteristic data collected by an external camera other than the eye tracking camera, wherein the first characteristic data represents data associated with eyes of a wearer of the wearable device, and the second characteristic data represents data associated with a face and a body of the wearer;

based on the first characteristic data and the second characteristic data, perform image reconstruction on the wearer to obtain a reconstructed image, and the reconstructed image being configured to represent a virtual image of the wearer; and send the reconstructed image to a communication device in communication with the wearable device, to allow the wearable device and the communication device to be in communication based on the reconstructed image;

wherein the first characteristic data comprises an eye characteristic data, the second characteristic data comprises a facial characteristic data and a body characteristic data, and the wearable device is configured to:

perform feature fusion on the eye characteristic data and the facial characteristic data to obtain a facial fusion data;

based on the facial fusion data and the body characteristic data, obtain a model-driven data; and based on the model-driven data and a voice data collected by the wearable device, obtain the reconstructed image;

wherein the wearable device is further configured to:

align the facial characteristic data with a standard facial data to obtain a facial alignment data;

based on an initial eye data in the facial alignment data and the eye characteristic data, obtain an eye correction scale;

correct the eye characteristic data based on the eye correction scale to obtain an eye correction data; and fuse the eye correction data into the facial alignment data to obtain the facial fusion data.

* * * * *